United States Patent
Inoue

[11] Patent Number: 5,301,727
[45] Date of Patent: Apr. 12, 1994

[54] RADIAL-PLY TIRE HAVING WAVY SIPES

[75] Inventor: Teruo Inoue, Osaka, Japan

[73] Assignee: Toyo Tie & Rubber Co., Ltd., Osaka, Japan

[21] Appl. No.: 981,924

[22] Filed: Nov. 23, 1992

Related U.S. Application Data

[63] Continuation of Ser. No. 534,590, Jun. 6, 1990, abandoned.

[30] Foreign Application Priority Data

Jun. 23, 1989 [JP] Japan ................... 1-161269

[51] Int. Cl.$^5$ .............................. B60C 11/12
[52] U.S. Cl. .................... 152/209 R; 152/DIG. 3
[58] Field of Search ......... 152/209 R, 209 D, DIG. 3

[56] References Cited

U.S. PATENT DOCUMENTS

| | | | |
|---|---|---|---|
| 3,498,354 | 3/1970 | Boileau | 152/209 R |
| 4,598,747 | 7/1986 | Flechtner | 152/DIG. 3 |
| 4,934,424 | 6/1990 | Kojima | 152/DIG. 3 |

FOREIGN PATENT DOCUMENTS

| | | |
|---|---|---|
| 3540668 | 5/1987 | Fed. Rep. of Germany ... 152/DIG. 3 |
| 3540669 | 5/1987 | Fed. Rep. of Germany ... 152/DIG. 3 |
| 55-114605 | 9/1980 | Japan . |
| 119507 | 9/1980 | Japan ................... 152/209 D |
| 56-21905 | 2/1981 | Japan . |
| 59-96003 | 6/1984 | Japan . |
| 59-199306 | 11/1984 | Japan . |
| 60-45405 | 3/1985 | Japan . |
| 61-261109 | 11/1986 | Japan . |
| 62-251204 | 11/1987 | Japan . |
| 63-235107 | 9/1988 | Japan . |

*Primary Examiner*—Geoffrey L. Knable
*Attorney, Agent, or Firm*—Jordan and Hamburg

[57] ABSTRACT

A radial-ply tire has a tread provided with at least one block isolated by longitudinal and transverse grooves. A central wavy sipe and a peripheral wavy sipe are disposed on the block, each of the wavy sipes running zigzag along a centerline, wherein the central wavy sipe makes a smaller angle with the centerline therefore than the peripheral wavy sipe with the centerline therefore.

11 Claims, 2 Drawing Sheets

RADIAL-PLY TIRE HAVING WAVY SIPES

This application is a continuation of application Ser. No. 07/534,590, filed Jun. 6, 1990, now abandoned.

BACKGROUND OF THE INVENTION

This invention relates to a radial-ply tire with a block pattern tread.

For a radial-ply tire, a variety of tread patterns has been proposed. The block pattern in which a plurality of longitudinal grooves running in a circumferential direction of the tire and a plurality of transverse grooves intersecting the longitudinal grooves form a number of islands or blocks is found typically in a mud-and-snow tire and the tire with such a tread pattern exhibits its potential to the fullest extent on ice or snow and muddy roads.

In the radial-ply tire with such a block pattern tread, it has been proposed to lower bending stiffness of the block by providing it with a plurality of sipes. Reducing the stiffness of the block in this manner enables the block to softly contact a road surface so that further improvements can be accomplished in ice and wet performances.

However, when the sipes are linear, block segments isolated by these linear sipes are able to move independently so that lateral stiffness of the block is markedly compromised. Hence, the distortion of the blocks is increased so much that a vehicle with the tire totters at a high speed.

To overcome this disadvantage, it is effective to form each sipe in a wavy pattern. When a plurality of wavy sipes is formed in the block, each block segment as isolated by such sipes certainly comes into contact with an adjacent segment of the same block irrespective of a direction of distortion, so that the distortion of the respective block segments is delimited as compared with the case of linear sipes, resulting in an improved stiffness of the block as a whole. As a consequence, not only ice and wet performances of the tire are improved but a satisfactory high-speed running performance can be obtained.

When wavy sipes of the same pattern are formed at equal intervals in the respective blocks of a radial-ply tire, it is impossible to insure a uniform contact of each block with a road surface. Thus, bending stiffness of any block segment that lies in a peripheral region of the block is then lower than that of a segment of the same size which lies in a central region of the block. This is because, whereas the central block segment has an adjacent block segment on either side, the block segment in the peripheral region has no adjacent segment on one side.

To insure uniformity of rigidity within each block with the foregoing taken into consideration, it is considered effective to increase density of sipes in the central region over that in the peripheral region. In such an arrangement, the block is more finely divided in the central region of high sipe density than in the peripheral region of low sipe density so that bending stiffness of the central segment only is relatively reduced to keep a balance.

However, when the sipe density in the central region is thus increased over that in the peripheral region, side edges of the block are worn (toe-and-heel wear) earlier than the center of the block so that an uneven wear within the block reduces tire life. In addition, tire vibrations are amplified.

The object of this invention, which has been accomplished against the above background, is to provide a radial-ply tire whose tread has a pattern of blocks as divided by a plurality of longitudinal grooves running in the circumferential direction of the tire and a plurality of transverse grooves intersecting the longitudinal grooves and each of the blocks being provided with a plurality of zigzag or wavy sipes, which tire has been improved in that distribution of stiffness in the respective blocks is rendered uniform while variation in wear within the respective blocks and tire noise are successfully reduced.

SUMMARY OF THE INVENTION

The above object is accomplished by the radial-ply tire of this invention where a central wavy sipe and a peripheral wavy sipe are disposed in a central region and a peripheral region of the block, respectively, each of the wavy sipes running zigzag along a centerline, wherein the central wavy sipe makes a smaller angle with the centerline therefor than the peripheral wavy sipe with the centerline therefor.

Irrespective of a direction of distortion, block segments separated by the wavy sipes come into contact with the adjacent block segments so that compared with linear sipes, distortion of the blocks is delimited, resulting in a somewhat increased stiffness of the block as a whole. In this feature, this invention is in common with the prior art described above. In this invention, however, the central wavy sipe makes a smaller angle with the centerline along which the wavy sipe runs zigzag than the peripheral wavy sipe with the centerline therefor and the block segment as divided by a nearly linear wavy sipe in the central region of the block is relatively low in lateral stiffness as compared with the block segments in the peripheral region. Therefore, a balance is established in lateral stiffness between the central segment and the peripheral segment having no adjacent block segment on one side, with the result that the bending stiffness is rendered uniform throughout the block. As a consequence, all the segments of each block contact a road surface in a uniform manner and are, therefore, subject to uniform wear. There is no problem of tire noise due to uneven wear.

This invention accomplishes its object the best when applied to a radial-ply tire where the centerlines for the central and peripheral wavy sipes run parallel with the transverse grooves which make angles slightly smaller than 90 degrees with an equatorial plane of the tire. The central wavy sipe, as well as the peripheral wavy sipe, may open into at least one of the longitudinal grooves or may be closed at both ends thereof. In a preferred mode of embodiment, all the central and peripheral sipes within the block open exclusively into one of the longitudinal grooves.

In another preferred mode of embodiment comprising a total of more than three central and peripheral wavy sipes, the centerlines are at substantially regular intervals. In this mode of embodiment, wavy sipes opening into one of the longitudinal grooves and wavy sipes opening into the other longitudinal groove can be alternately disposed within the same block. Furthermore, wavy sipes opening into at least one of the longitudinal grooves and wavy sipes which are closed at both ends thereof may be alternately disposed within the same block.

DETAILED DESCRIPTION OF THE PREFERRED EMBODIMENT

Figure 1:
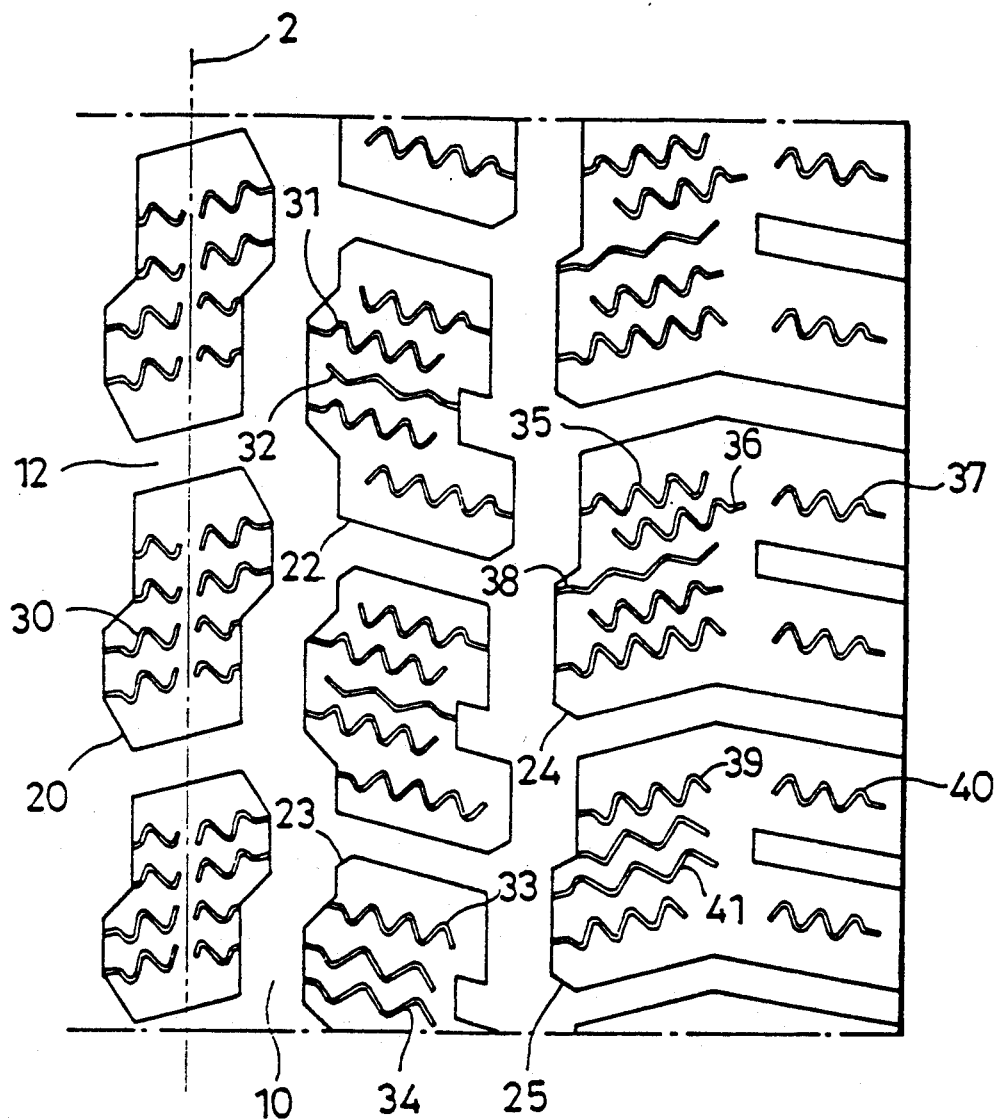
FIG. 1 is a diagrammatic view in partial development showing a tread pattern of a radial-ply tire according to the invention.

FIG. 1 is a diagrammatic view in partial development which illustrates a tread pattern of a radial-ply tire of the invention. It should be understood that the left half of the pattern is not shown.

The tread of this tire is provided with a plurality of longitudinal grooves 10 running in the circumferential direction of the tire and a plurality of transverse grooves 12 intersecting the longitudinal grooves to form a multiplicity of blocks 20;22,23;24,25 and the tread pattern is in axial symmetry about the equatorial plane 2 of the tire. However, both the longitudinal groove 10 and the transverse groove 12 are zigzag; neither of them is straight. Furthermore, all the transverse grooves 12 are inclined at an angle somewhat smaller than 90 degrees from the equatorial plane 2.

In each of the narrow-width blocks 20 in the first row as arranged in the circumferential direction of the tire on its equatorial plane 2, four wavy open sipes 30 are extending towards the equatorial plane 2 from each of the right-hand and left-hand longitudinal grooves 10 with substantially equal spacings therebetween. The centerlines of the zigzags of these wavy sipes 30 are substantially parallel to the adjacent transverse grooves 12.

Each of the second-row blocks 22,23 arranged adjacently of the first row blocks 20 in the circumferential direction of the tire is greater in transverse width than the first-row block 20. The second-row blocks 22,33 are provided with wavy open sipes 31,32;33,34, respectively. All of these sipes are disposed in parallel with the adjacent transverse grooves 12 and inclined in the opposite direction to the wavy sipes 30 in the first-row blocks 20.

Figure 2:
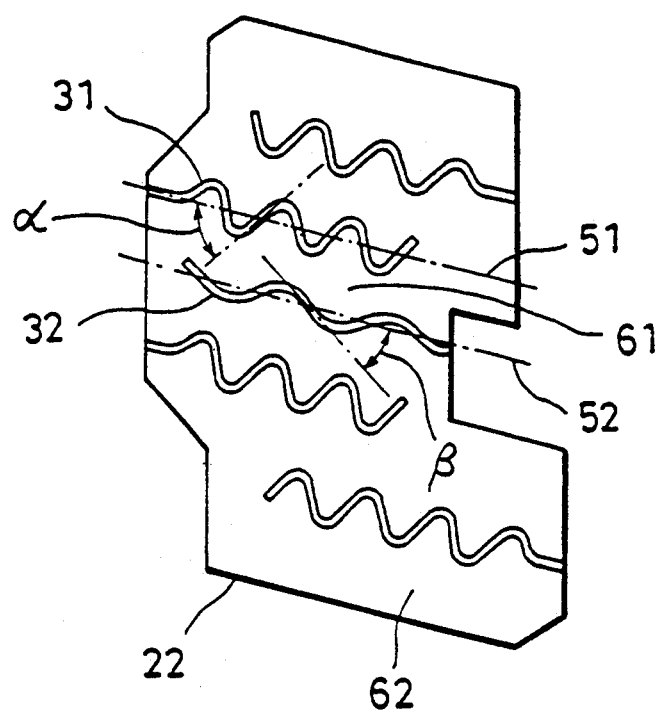
FIG. 2 is a plan view showing one block in the tread pattern of FIG. 1 on exaggerated scale.

In the block 22, the wavy sipes 31 opening into the left-hand longitudinal groove 10 are alternating with the wavy sipes 32 opening into the right-hand longitudinal groove 10. This block 22 is illustrated on exaggerated scale in FIG. 2. Of five sipes formed in this block 22, four wavy sipes 31 in the peripheal region of the block are comparatively greater in the degree of zigzag with the angle $\alpha$ with respect to the centerline 51 of the zigzag being as large as in the wavy sipes 30 in the first-row block 20. The single wavy sipe 32 in the central region of the block is close to a linear sipe in configuration with the angle of $\beta$ with the centerline 52 of the zigzag being smaller than said angle $\alpha$. The intersipe distances within the block 22 are substantially equal.

The other block 23 in the second row is smaller than the above block 22 in circumferential length and, as illustrated in FIG. 1, is provided with wavy open sipes 33,34 opening only into the adjoining longitudinal groove 10 on the left side. However, the angle which the wavy sipes 33 in the peripheral region of the block make with the centerline of the zigzag is as large as that of the wavy sipes 30 in the first-row block 20. In contrast, the two wavy sipes 34 in the block center make a smaller angle with the centerline of the zigzag and are greater in the amplitude of the zigzag. The intersipe distances are substantially equal in this block 23, too.

The third-row blocks 24,25 arranged in the circumferential direction of the tire at a tire shoulder adjacent to the above second-row blocks 22,23 are still larger than the second-row blocks 22,33 in transverse width. Each of the third-row blocks 24,25 is not only provided with wavy open sipes 35,38;39,41 opening into the longitudinal groove 10 on the left side but also with closed sipes 36,37;40 which are similarly wavy but closed at both ends. These sipes are invariably disposed in parallel with the adjacent transverse grooves 12, and whereas the wavy sipes 35,36,38;39,41 in the left half are inclined in the opposite direction to the wavy sipes 31,32;33,34 in the second-row blocks 22,23, the wavy sipes 37,40 formed in the right half are inclined in the same direction as the wavy sipes in the second-row blocks.

In the left portion of the block 24, wavy open sipes 35,38 and wavy closed sipes 36 are alternately disposed. Of the five sipes formed in the left portion of this block 24, the four wavy sipes 35,36 in the peripheral region are greater in the degree of zigzag with the angle they make with the centerline of the zigzag being as large as that of the wavy sipes 30 in the first-row block 20. The single wavy open sipe 38 in the center of the block is close to a linear sipe in configuration, with the angle it makes with the centerline of the zigzag being small. However, the intersipe distances in the left portion of the block 24 are substantially equal.

The other blocks 25 in the third row are smaller than the above block 24 in circumferential length and the left side of each block is provided with four wavy open sipes 39,41 opening exclusively into the longitudinal groove 10 on the left side. However, the angle which the two wavy sipes 39 in the peripheral region of this block make with the centerline of the zigzag is substantially as large as that of the wavy sipes 30 in the first-row block 20. In contrast, the two wavy sipes 41 in the central region of the block are small in the angle they make with the centerline of the zigzag and greater in the amplitude of the zigzag. In the left portion of this block 25, the intersipe distances are substantially equal.

The effects of the wavy sipes 31,32 described above will be explained, taking the block 22 as an example. It should be understood that the same explanation applies to the other blocks 23,24,25 as well.

In the block 22 divided by wavy sipes 31,32, irrespective of a direction of distortion, each block segment comes into contact with the adjacent block segment so that compared with linear sipes, the distortion of the respective block segments is delimited to insure a somewhat increased stiffness of the block 22 as a whole. However, since the angle $\beta$ which the single central wavy sipe 32 makes with the centerline 52 of the zigzag is smaller than the angle $\alpha$ the four peripheral wavy sipes 31 make with the centerline 51, the block segment 61 divided by the central wavy sipe 32, which is close to a linear sipe in configuration, is lower than the peripheral block segments 62 in lateral stiffness. Therefore, a balance is established in stiffness with the peripheral block segment 62 which has no adjacent block segment on one side, with the result that a distribution of bending stiffness in the whole block 22 is rendered uniform. As a consequence, the whole segments within the block 22 contact a road surface in a uniform manner and hence ensure uniform wear without tire noise.

What is claimed is:

1. A radial-ply tire having an equatorial plane and a tread provided with longitudinal and transverse grooves thereon comprising:
- a block isolated by the longitudinal and transverse grooves on the tread; and
- a central wavy sipe and a peripheral wavy sipe disposed in a central region and a peripheral region of the block, respectively, with respect to a circumferential direction of the tire, each of the wavy sipes running zigzag along a centerline, wherein the centerlines for the central and peripheral wavy sipes extend in parallel to each other and substantially transversely relative to said equatorial plane and the central wavy sipe makes a smaller angle with the centerline therefor than the peripheral wavy sipe with the centerline therefor.

2. The radial-ply tire of claim 1 wherein the central wavy sipe opens into at least one of the longitudinal grooves.

3. The radial-ply tire of claim 1 wherein the central wavy sipe is closed at both ends thereof.

4. The radial-ply tire of claim 1 wherein the peripheral wavy sipe opens into at least one of the longitudinal grooves.

5. The radial-ply tire of claim 1 wherein the peripheral wavy sipe is closed at both ends thereof.

6. The radial-ply tire of claim 1 wherein all the central and peripheral sipes within the block open exclusively into one of the longitudinal grooves.

7. The radial-ply tire of claim 1 comprising a total of more than three central and peripheral wavy sipes for which the centerlines are at substantially regular intervals.

8. The radial-ply tire of claim 1 comprising a total of more than three central and peripheral wavy sipes wherein each of the wavy sipes opens into one or the other of two of said longitudinal grooves and the wavy sipes which open into said one of the longitudinal grooves alternate with said wavy sipes which open into said other of the longitudinal grooves.

9. The radial-ply tire of claim 1 comprising a total of more than three central and peripheral wavy sipes wherein some of the wavy sipes opening into at least one of the longitudinal grooves and other of the wavy sipes being closed at both ends and said some wavy sipes alternating with said other wavy sipes.

10. A radial-ply tire having an equatorial plane and a tread provided with longitudinal and transverse grooves thereon comprising:
- a block isolated by the longitudinal and transverse grooves on the tread; and
- a central wavy sipe and a peripheral wavy sipe disposed in a central region and a peripheral region of the block, respectively, with respect to a circumferential direction of the tire, each of the wavy sipes running zigzag along a centerline, wherein the centerlines for the central and peripheral wavy sipes run parallel with the transverse grooves and the central wavy sipe makes a smaller angle with the centerline therefor than the peripheral wavy sipe with the centerline therefor.

11. The radial-ply tire of claim 10 wherein the transverse grooves make angles differing slightly from 90 degrees with the equatorial plane.

* * * * *